US008855924B2

(12) United States Patent
Sukenari

(10) Patent No.: US 8,855,924 B2
(45) Date of Patent: Oct. 7, 2014

(54) SCHEDULING SYSTEM, METHOD, AND PROGRAM

(75) Inventor: Teruki Sukenari, Minato-ku (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/579,099

(22) PCT Filed: Mar. 2, 2011

(86) PCT No.: PCT/JP2011/001212
§ 371 (c)(1),
(2), (4) Date: Aug. 15, 2012

(87) PCT Pub. No.: WO2011/114635
PCT Pub. Date: Sep. 22, 2011

(65) Prior Publication Data
US 2012/0316773 A1 Dec. 13, 2012

(30) Foreign Application Priority Data

Mar. 17, 2010 (JP) ................................. 2010-061120

(51) Int. Cl.
G08G 5/04 (2006.01)
G01C 21/00 (2006.01)
G06Q 10/06 (2012.01)
G08G 1/0968 (2006.01)
G06Q 50/30 (2012.01)
G06Q 50/28 (2012.01)
G06Q 10/04 (2012.01)
G08G 5/00 (2006.01)

(52) U.S. Cl.
CPC .... *G08G 1/096822* (2013.01); *G06Q 10/06316* (2013.01); *G08G 1/096844* (2013.01); *G06Q 50/30* (2013.01); *G06Q 50/28* (2013.01); *G06Q 10/047* (2013.01); *G08G 5/0034* (2013.01)

USPC .......................................................... 701/414
(58) Field of Classification Search
USPC .......................................................... 701/414
See application file for complete search history.

(56) References Cited

U.S. PATENT DOCUMENTS 5,941,929 A * 8/1999 Shiomi et al. ................. 701/120
6,085,145 A 7/2000 Taka et al.
(Continued)

FOREIGN PATENT DOCUMENTS

CN 101395647 A 3/2009
CN 101755247 A 6/2010
(Continued)

OTHER PUBLICATIONS

Yutaka Fukuda et al. "Development of Assisting Tool for Time Management of Air Traffic Control," Technical report of IEICE. SANE 108(169), pp. 23-28, Jul. 18, 2008.
(Continued)

*Primary Examiner* — Mary Cheung
*Assistant Examiner* — Anne Mazzara
(74) *Attorney, Agent, or Firm* — Sughrue Mion, PLLC

(57) ABSTRACT

A scheduling system includes: link creation means for creating a link as a partial route obtained by dividing the traveling route of a moving body indicated by traveling plan data; link adjustment range calculating means for calculating, for each link, a link adjustment range as an adjustment range of a scheduled pass-through time of the moving body not to cause the moving body to have a near-miss with another moving body; and adjusted traveling plan deciding means for deciding on adjusted traveling plan data indicative of a traveling plan of the moving body after adjusted by using link adjustment ranges of all links constructing the traveling route.

8 Claims, 12 Drawing Sheets

(56) References Cited

U.S. PATENT DOCUMENTS

| | | | |
|---|---|---|---|
| 2008/0103647 A1* | 5/2008 | Lucas et al. | 701/16 |
| 2009/0088972 A1* | 4/2009 | Bushnell | 701/210 |
| 2009/0125221 A1* | 5/2009 | Estkowski et al. | 701/120 |

FOREIGN PATENT DOCUMENTS

| | | |
|---|---|---|
| JP | 7-65300 A | 3/1995 |
| JP | 10-208200 A | 8/1998 |
| JP | 10-340399 A | 12/1998 |
| JP | 2007-4252 A | 1/2007 |
| JP | 2008-110759 A | 5/2008 |

OTHER PUBLICATIONS

International Search Report for PCT/JP2011/001212 dated Jun. 7, 2011.

Communication dated May 26, 2014, issued by the State Intellectual Property Office of the People's Republic of China in corresponding Application No. 201180013793.5.

* cited by examiner

SCHEDULING SYSTEM, METHOD, AND PROGRAM

CROSS REFERENCE TO RELATED APPLICATIONS

This application is a National Stage of International Application No. PCT/JP2011/001212 filed Mar. 2, 2011, claiming priority based on Japanese Patent Application No. 2010-061120 filed Mar. 17, 2010, the contents of all of which are incorporated herein by reference in their entirety.

TECHNICAL FIELD

The present invention relates to a scheduling system, a scheduling method, and a scheduling program for deciding on a traveling plan of a moving body.

BACKGROUND ART

In general, a scheduling system is used to decide on a traveling plan of a moving body (e.g., an airplane, a train, a bus, or the like) passing through a "predetermined position (specified pass-through position)" at a "predetermined scheduled time (scheduled pass-through time)" to prevent a near-miss between moving bodies. An example of a common scheduling system is described in Non-Patent Literature (NPL) 1.

The scheduling system described in NPL 1 is an air traffic control scheduling system in which airplanes are moving bodies and which is designed to decide on a flight plan that causes no near-miss between airplanes. The flight plan (traveling plan) of an airplane includes "specified pass-through positions (latitude and longitude)" and "scheduled pass-through times" associated with multiple specified pass-through positions. In other words, the airplane travels for a destination airport to pass through the specified pass-through positions at the scheduled pass-through times according to the flight plan acquired at a departure airport.

However, in an actual flight, the airplane may not be able to pass through the specified pass-through positions at the scheduled pass-through times due to the influence of weather variance or the like. In such a case, the air traffic control scheduling system adjusts the flight plan acquired at the departure airport to decide on a "new flight plan (hereinafter called an adjusted traveling plan) that causes no near-miss."

The air traffic control scheduling system described in NPL 1 will be described. The air traffic control scheduling system described in NPL 1 focuses attention on one airplane (hereinafter called an attention moving body) traveling in an air area to decide on an adjusted traveling plan not to cause the attention moving body to have near-misses with airplanes (hereinafter called neighboring moving bodies) traveling in the air area other than the attention moving body. This adjusted traveling plan is a result of adjustment of the "traveling plan of the attention moving body (hereinafter called an attention traveling plan)" without adjusting "traveling plans of the neighboring moving bodies (hereinafter called neighboring traveling plans)."

First, a simulation is performed to determine whether a conflict occurs when the attention moving body and the neighboring moving bodies travel according to the current attention traveling plan and neighboring traveling plans. If there is even one neighboring moving body having a near-miss with the attention moving body, a scheduled pass-through time associated with any specified pass-through position included in the attention traveling plan will be adjusted (e.g., the scheduled pass-through time is pushed forward or backward). Then, using the adjusted attention traveling plan, a simulation is performed again to determine whether the attention moving body has a near-miss with any neighboring moving body.

After that, "attention traveling plan adjustment processing" and "near-miss simulation processing" are repeated, and once an adjusted traveling plan can be fixed, the repeatedly performed processing is ended.

CITATION LIST

Non Patent Literature

NPL 1: Yutaka FUKUDA, and two others, "Development of Assisting Tool for Time Management of Air Traffic Control," Technical report of IEICE. SANE 108(169), pp. 23-28, Jul. 18, 2008.

SUMMARY OF INVENTION

Technical Problem

The problem of the method described in NPL 1 is that it takes long time to decide on the adjusted traveling plan. That is because "processing for adjusting a scheduled pass-through time associated with any specified pass-through position of the attention moving body (sequential adjustment of the attention traveling plan" and "near-miss simulation processing" must be repeatedly performed to decide on the adjusted traveling plan in order not to cause any near-miss between the attention moving body and the neighboring moving bodies.

Therefore, it is an object of the present invention to provide a scheduling system, a scheduling method, and a scheduling program capable of deciding on an adjusted traveling plan at high speed.

Solutions to Problem

The scheduling system according to the present invention is characterized by including: link creation means for creating a link as a partial route obtained by dividing a traveling route of a moving body indicated by traveling plan data; link adjustment range calculating means for calculating, for each link, a link adjustment range as the adjustment range of a scheduled pass-through time of the moving body not to cause the moving body to have a near-miss with another moving body; and adjusted traveling plan deciding means for deciding on adjusted traveling plan data indicative of a traveling plan of the moving body after adjusted by using link adjustment ranges of all links constructing the traveling route.

The scheduling method according to the present invention is characterized by including: creating a link as a partial route obtained by dividing a traveling route of a moving body indicated by traveling plan data; calculating, for each link, a link adjustment range as the adjustment range of a scheduled pass-through time of the moving body not to cause the moving body to have a near-miss with another moving body; and deciding on adjusted traveling plan data indicative of a traveling plan of the moving body after adjusted by using link adjustment ranges of all links constructing the traveling route.

The scheduling program according to the present invention is characterized by causing a computer to perform: link creation processing for creating a link as a partial route obtained by dividing a traveling route of a moving body indicated by traveling plan data; link adjustment range calculation processing for calculating, for each link, a link adjustment range as the adjustment range of a scheduled pass-through time of the moving body not to cause the moving body to have a near-miss with another moving body; and adjusted traveling plan decision processing for deciding on adjusted traveling plan data indicative of a traveling plan of the moving body after adjusted by using link adjustment ranges of all links constructing the traveling route.

Advantageous Effect of Invention

According to the present invention, an adjusted traveling plan can be decided at high speed.

DESCRIPTION OF EMBODIMENTS

Exemplary Embodiment 1

Figure 1:
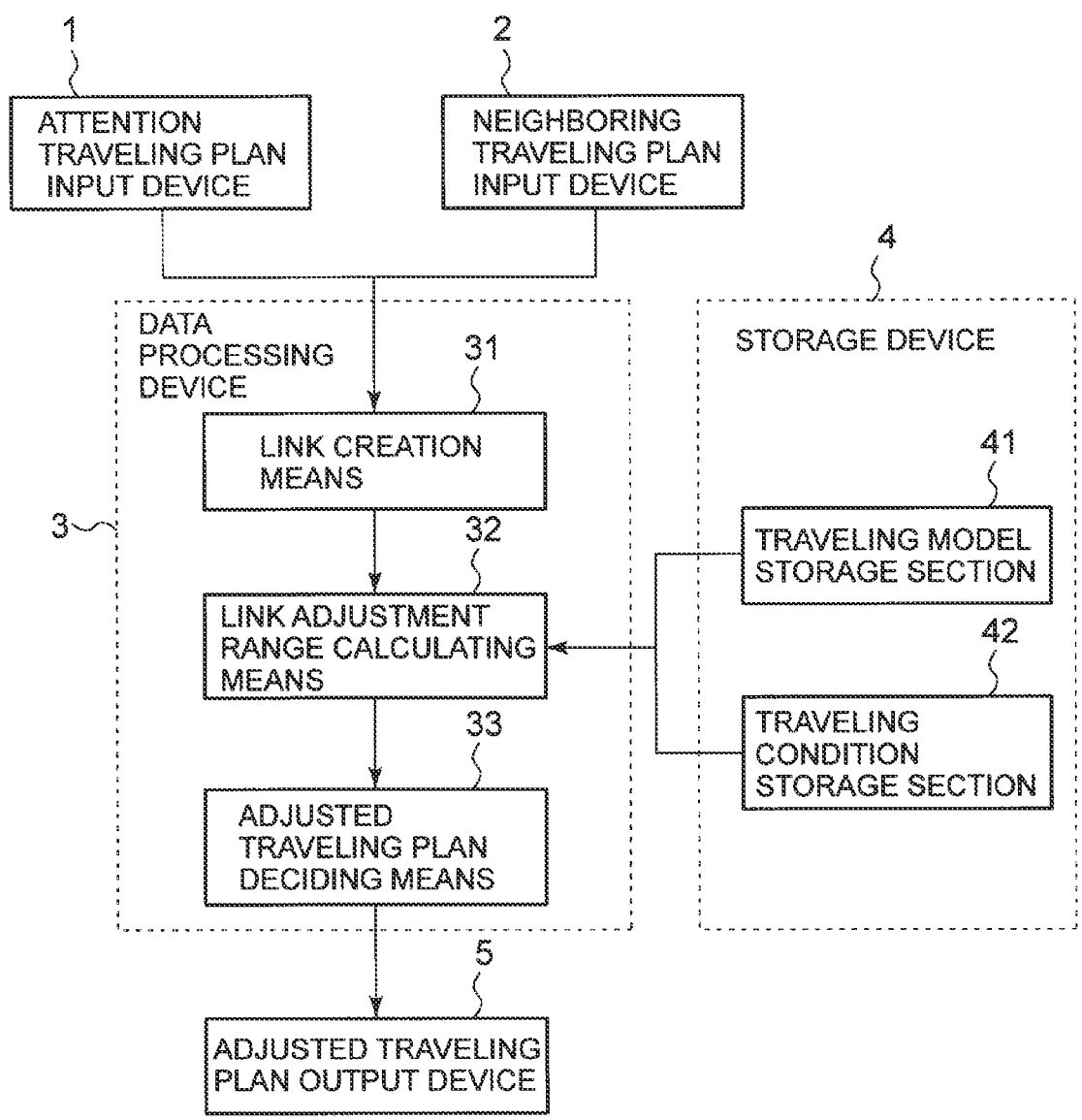
FIG. 1 is a block diagram showing an example of the configuration of a first exemplary embodiment of a scheduling system according to the present invention.

A first exemplary embodiment of the present invention will next be described with reference to the accompanying drawings. FIG. 1 is a block diagram showing an example of the configuration of the first exemplary embodiment of a scheduling system according to the present invention. Referring to FIG. 1, the scheduling system includes an attention traveling plan input device 1, a neighboring traveling plan input device 2, a data processing device 3, a storage device 4, and an adjusted traveling plan output device 5.

Specifically, the attention traveling plan input device 1, the neighboring traveling plan input device 2, the data processing device 3, and the adjusted traveling plan output device 5 are implemented by an information processing apparatus, such as a computer (e.g., a personal computer or a workstation), operating according to a program, including a data processing function, a data communication function, and the like.

The storage device 4 is specifically implemented by an optical disk drive, a magnetic disk drive, or the like, including a data storage function for storing a database and the like.

The attention traveling plan input device 1 has the function of inputting traveling plan data indicative of a traveling plan of an "attention moving body for which the traveling plan is to be adjusted."

The neighboring traveling plan input device 2 has the function of inputting traveling plan data indicative of traveling plans of "all neighboring moving bodies but the attention moving body."

The storage device 4 has a traveling model storage section 41 and a traveling condition storage section 42.

The traveling model storage section 41 prestores traveling model data indicative of a traveling model when a moving body moves from link to link. As an example of the traveling model, there is uniform motion, uniformly accelerated motion, or the like. The traveling model data is, for example, preregistered by an administrator in the traveling model storage section 41. In the exemplary embodiment, a line segment connecting between two specified pass-through positions in a traveling plan is called a link.

The traveling condition storage section 42 prestores traveling condition data indicative of traveling conditions such as restrictions when a moving body moves from link to link. As an example of the traveling conditions, there is a restriction that the link travel time (e.g., the time for the moving body to travel over a predetermined link) shall be a specified time or less. The traveling condition data is, for example, preregistered by the administrator in the traveling condition storage section 42.

The data processing device 3 includes link creation means 31, link adjustment range calculating means 32, and adjusted traveling plan deciding means 33.

The link creation means 31 is specifically implemented by a CPU of the information processing apparatus operating according to the program. The link creation means 31 has the function of creating a link as a line segment connecting between different two specified pass-through positions of each of moving bodies based on the traveling plan data input by the attention traveling plan input device 1 and the neighboring traveling plan input device 2. The link creation means 31 also has the function of specifying a predetermined number of specified pass-through positions from a departure place to a destination based on the traveling plan data.

The link adjustment range calculating means 32 is specifically implemented by the CPU of the information processing apparatus operating according to the program. The link adjustment range calculating means 32 has the function of calculating, for each link, an "adjustment 'range' (hereinafter called link adjustment range) of a scheduled pass-through time of an attention moving body" based on the traveling model data stored in the traveling model storage section 41 so that the attention moving body will not have a near-miss with any neighboring moving body. Further, the link adjustment range calculating means 32 has the function of referencing the traveling condition storage section 42 and modifying the link adjustment range to satisfy traveling conditions when the traveling conditions are set for the link. In the exemplary embodiment, the link adjustment range calculating means 32 determines a near-miss state when a linear distance between moving bodies becomes a predetermined distance (e.g., safe distance R) or less.

The adjusted traveling plan deciding means 33 is specifically implemented by the CPU of the information processing apparatus operating according to the program. The adjusted traveling plan deciding means 33 has the function of referencing a link adjustment range corresponding to each link of the attention moving body calculated by the link adjustment range calculating means 32, calculating a product set of link adjustment ranges capable of avoiding any near-miss commonly for all links, and deciding on an adjusted traveling plan.

Figure 2:
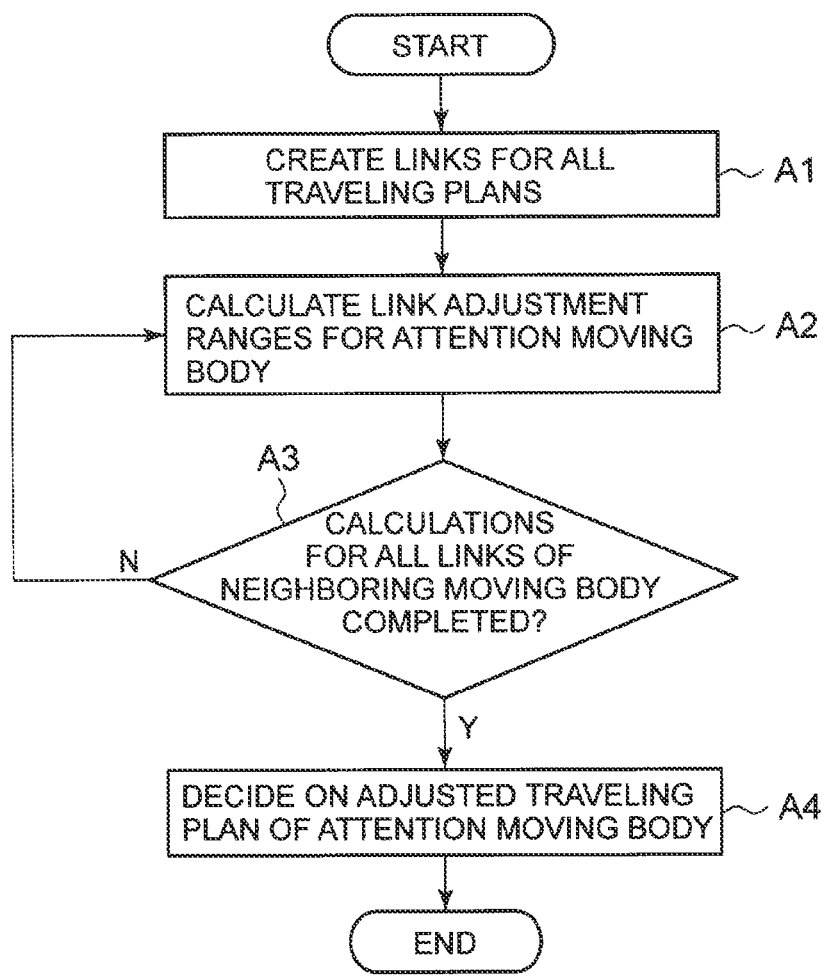
FIG. 2 is a flowchart showing an example of operation performed by the scheduling system.

Referring next to FIG. 1 and FIG. 2, the operation of the scheduling system will be described. FIG. 2 is a flowchart showing an example of operation performed by the scheduling system.

When the administrator performs input operations on an attention traveling plan using the attention traveling plan input device 1 to adjust a traveling plan, the attention traveling plan input device 1 inputs, to the link creation means 31, traveling plan data on an attention moving body indicative of the attention traveling plan according to the operations of the administrator. Further, when the administrator performs input operations on a neighboring traveling plan using the neighboring traveling plan input device 2, the neighboring traveling plan input device 2 inputs, to the link creation means 31, traveling plan data on a neighboring moving body indicative of the neighboring traveling plan according to the operations of the administrator.

Next, the link creation means 31 creates a link as a line segment connecting between different two specified pass-through positions of each of moving bodies from all pieces of input traveling plan data (step A1 in FIG. 2). Then, the link creation means 31 outputs the created link to the link adjustment range calculating means 32.

Next, based on traveling model data on each link stored in the traveling model storage section 41, the link adjustment range calculating means 32 calculates, for each link, an "adjustment 'range' (link adjustment range) of a scheduled pass-through time of the attention moving body" so that the attention moving body will not have a near-miss with the neighboring moving body. After that, the link adjustment range calculating means 32 modifies the link adjustment range based on traveling condition data on each link stored in the traveling condition storage section 42 (step A2 in FIG. 2).

Next, the link adjustment range calculating means 32 determines whether the calculations of link adjustment ranges for all links are completed (step A3 in FIG. 2). When determining that the calculations are not completed, the link adjustment range calculating means 32 shifts the procedure to step A2, repeating the subsequent processing. When determining that the calculations are completed, the link adjustment range calculating means 32 outputs the calculated link adjustment ranges to the adjusted traveling plan deciding means 33, and shifts the procedure to step A4.

Based on the link adjustment range of the attention moving body output for each link from the link adjustment range calculating means 32, the adjusted traveling plan deciding means 33 calculates a product set of link adjustment ranges capable of avoiding any near-miss commonly for all links to decide on an adjusted traveling plan (step A4 in FIG. 2). Specifically, the adjusted traveling plan deciding means 33 generates traveling plan data indicative of an adjusted traveling plan based on the calculated product set of link adjustment ranges, and outputs it to the adjusted traveling plan output device 5.

Next, a specific example of the operation of the scheduling system of the first exemplary embodiment will be described.

A physical configuration of the scheduling system in the exemplary embodiment will be described. The scheduling system in the exemplary embodiment includes the attention traveling plan input device 1, the neighboring traveling plan input device 2, the data processing device 3, the storage device 4, and the adjusted traveling plan output device 5.

The attention traveling plan input device 1, the neighboring traveling plan input device 2, the data processing device 3, and the adjusted traveling plan output device 5 are specifically implemented by an information processing apparatus such as a computer (e.g., a personal computer or a workstation) equipped with a data processing unit implemented by a CPU (Central Processing Unit) or the like, a data communication unit conforming to the Ethernet (registered trademark), wireless LAN, a dedicated communication network, or the like, and data storage units, such as a RAM (Random Access Memory), a ROM (Read Only Memory), an HDD (Hard Disk Drive), and the like. The storage device 4 is specifically implemented by an optical disk drive, a magnetic disk drive, or the like to store a database and the like.

Figure 3:
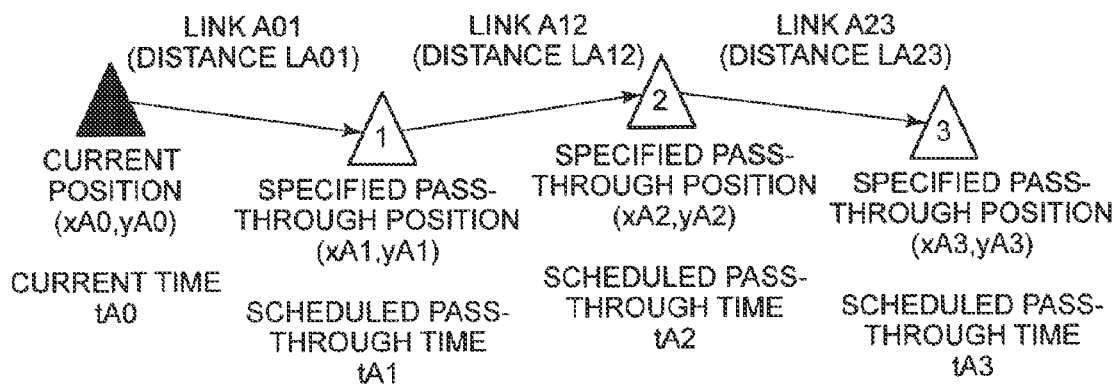
FIG. 3 is an explanatory diagram showing an example of an attention traveling plan.

As a specific example of a traveling plan, an attention traveling plan of an attention moving body (A) is shown in FIG. 3. FIG. 3 is an explanatory diagram showing an example of the attention traveling plan.

In the example shown in FIG. 3, the attention moving body is located at a current position (xA0, yA0) at a current time tA0. Then, the attention moving body travels to pass through specified pass-through positions (xA1, yA1), (xA2, yA2), and (xA3, yA3) at scheduled pass-through times tA1, tA2, and tA3, respectively. For example, assuming that the moving body is an airplane, x and y of each specified pass-through position corresponds to the longitude and latitude, respectively. Further, assuming that the moving body is a bus, the specified pass-through position corresponds to a bus stop, an intersection, or the like.

Figure 4:
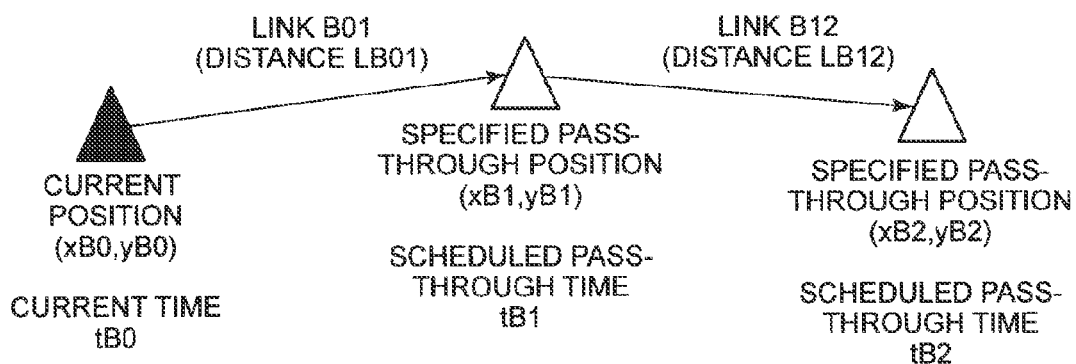
FIG. 4 is an explanatory diagram showing an example of a neighboring traveling plan.

Further, as another specific example of the traveling plan, a neighboring traveling plan of a neighboring moving body (B) is shown in FIG. 4. FIG. 4 is an explanatory diagram showing an example of the neighboring traveling plan.

In the example of the neighboring traveling plan shown in FIG. 4, the neighboring traveling plan differs from the attention traveling plan only in the number of specified pass-through positions. In the following, it is assumed in the exemplary embodiment that only one neighboring moving body exists, but two or more neighboring moving bodies can exist. Further, in the exemplary embodiment, a near-miss is determined when a linear distance between the attention moving body and the neighboring moving body at any time falls below safe distance R after the moving bodies travel according to the traveling plans as shown in FIGS. 3 and 4.

Next, a method of creating a link from a traveling plan will be described. Specifically, the link creation means 31 shown in FIG. 1 creates the link.

As the simplest link creation method, the link creation means 31 creates, as a link, a line segment connecting for example, between the current position and an adjacent specified pass-through position or between adjacent specified pass-through positions as shown in FIG. 3 or 4. However, in this link creation method, the number of links increases as the number of specified pass-through positions increases. As a result, since the link adjustment range calculating means 32 calculates link adjustment ranges for all links, the processing time becomes long.

Figure 5:
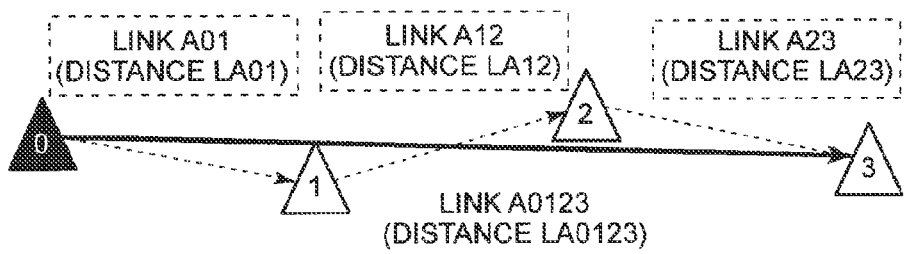
FIG. 5 is an explanatory diagram showing an example of a link across two or more specified pass-through positions.

Therefore, for example, as shown in FIG. 5, if each specified pass-through position exists near an approximate straight line connecting two or more specified pass-through positions, the link creation means 31 may create a link to span across the two or more specified pass-through positions. FIG. 5 is an explanatory diagram showing an example of the link across the two or more specified pass-through positions. In the following description, a line segment connecting between the current position and an adjacent specified pass-through position or between adjacent specified pass-through positions is used as a link.

Next, a method of calculating a link adjustment range will be described. Specifically, the link adjustment range calculating means 32 shown in FIG. 1 performs processing for calculating a link adjustment range.

Figure 6:
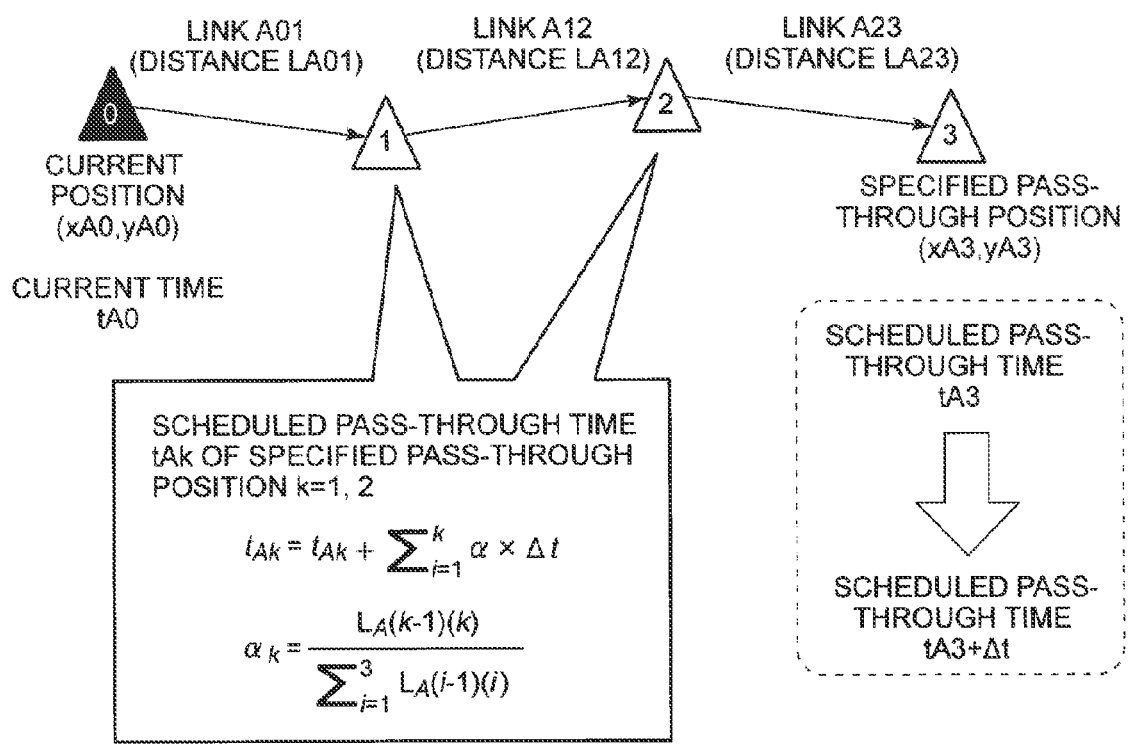
FIG. 6 is an explanatory diagram showing an example of an adjusted traveling plan.

In an adjusted traveling plan of the attention moving body, it is assumed that scheduled pass-through time tA3 of the final specified pass-through position (corresponding to the specified pass-through position 3 in FIG. 3) is changed to tA3+Δt. It is also assumed, for example, that a traveling model of links A01, A12, and A23 stored in the traveling model storage section 41 is uniform-velocity traveling. In this case, the link adjustment range calculating means 32 calculates scheduled pass-through time tAk of specified pass-through position k=1, 2 using link distance LA(k−1)(k) as shown in FIG. 6.

Since the current time at the current position cannot be modified, it is left to tA0. In the following description, it is assumed that the traveling model for the links of the moving body is uniform-velocity traveling, but the present invention is not limited thereto. For example, the traveling model may be traveling with uniform acceleration. Like in the above example, the link adjustment range calculating means 32 can calculate scheduled pass-through time tAk of specified pass-through position k=1, 2 using Δt even if the traveling model is not uniform-velocity traveling.

Focusing here on link A12 of the attention moving body, the link adjustment range calculating means 32 can determine a position xA(t), yA(t) at any time t using Equations (1) and (2), respectively, when the attention moving body travels link A12 at uniform velocity.

[Math. 1]

$$x_A(t) = x_{A1} + \frac{x_{A2} - x_{A1}}{t_{A2}(\Delta t) - t_{A1}(\Delta t)} \{t - t_{A1}(\Delta t)\} \qquad \text{formula (1)}$$

$$y_A(t) = y_{A1} + \frac{y_{A2} - y_{A1}}{t_{A2}(\Delta t) - t_{A1}(\Delta t)} \{t - t_{A1}(\Delta t)\} \qquad \text{formula (2)}$$

Similarly, focusing on link B12 of the neighboring moving body, the link adjustment range calculating means 32 can determine a position xB(t), yB(t) at any time t using Equation (3) and (4), respectively, when the neighboring moving body travels link B12 at uniform velocity.

[Math. 2]

$$x_B(t) = x_{B1} + \frac{x_{B2} - x_{B1}}{t_{B2} - t_{B1}} \{t - t_{B1}\} \qquad \text{formula (3)}$$

$$y_B(t) = y_{B1} + \frac{y_{B2} - y_{B1}}{t_{B2} - t_{B1}} \{t - t_{B1}\} \qquad \text{formula (4)}$$

Since the scheduled pass-through time in the neighboring traveling plan is not changed, the position xB(t), yB(t) of the neighboring moving body at any time t does not include Δt.

Further, the link adjustment range calculating means 32 can determine distance L between the attention moving body and the neighboring moving body at any time t from the position xA(t), yA(t) and the position xB(t), yB(t) using Equation (5).

[Math. 3]

$$L = \sqrt{\{x_A(t) - x_B(t)\}^2 + \{y_A(t) - y_B(t)\}^2} \qquad \text{formula (5)}$$

To prevent a near-miss between the attention moving body and the neighboring moving body, Δt to satisfy "distance L>safe distance R" at any time has just to be calculated. Thus, "link adjustment range ΔtA12B12 of link A12 of the attention moving body" to prevent a near-miss with the neighboring moving body traveling link B12 is expressed by Equation (6).

[Math. 4]

$$\Delta t_{A12B12L} < \Delta t_{A12B12} < \Delta t_{A12B12U}$$

$$\Delta t_{A12B12} \text{ subject to } \{L(\Delta t_{A12B12}) > R\} \qquad \text{formula (6)}$$

ΔtA12B12L in Equation (6) indicates a lower limit in the adjustment range ΔtA12B12. On the other hand, ΔtA12B12U in Equation (6) indicates an upper limit in the adjustment range ΔtA12B12.

The link adjustment range calculating means 32 calculates link adjustment ranges for all links of the attention moving body with respect to all links of the neighboring moving body. In the traveling plans of FIGS. 3 and 4, since the number of links of the attention moving body is three and the number of links of the neighboring moving body is two, the number of link pairs is 6(=3×2). Therefore, the link adjustment range calculating means 32 performs calculations on the link adjustment ranges six times in total. Equation (6) is generally a high degree of Δt inequality. Therefore, the link adjustment range calculating means 32 solves Equation (6) using a known solution, such as an algebraic solution (e.g., the Ferrari solution of a quartic equation) or an approximate solution (e.g., Newton's method).

Figure 7:
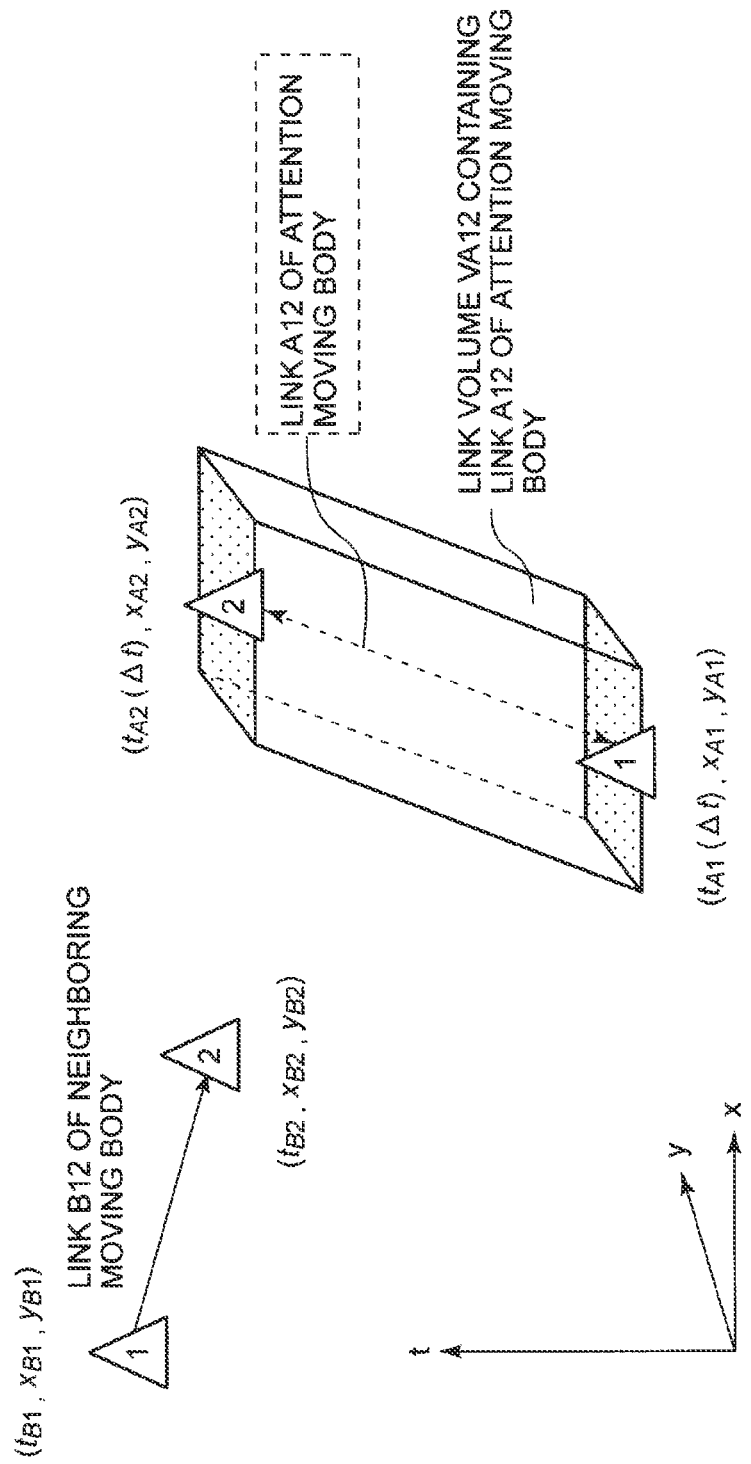
FIG. 7 is an explanatory diagram showing an example of a link volume used to calculate a link adjustment range.

When the number of link pairs is large and hence it takes long time to solve a high-degree equation, the link adjustment range calculating means 32 may use a "hexahedron (hereinafter called link volume VA12) containing link A12 of the attention moving body in three-dimensional space (t-x-y)" as shown, for example, in FIG. 7 to perform an approximate calculation for a link adjustment range. The link volume VA12 consists of a top face and a bottom face (corresponding to two filled faces in FIG. 7) in parallel with the xy plane and containing specified pass-through positions 1 and 2 in the planes, and four side faces. In the link volume VA12, it is assumed that the normal distance from the specified pass-through position 2 to each side of the top face takes a larger value than that of safe distance R. Similarly, it is assumed that the normal distance from the specified pass-through position 1 to each side of the bottom face takes a larger value than that of safe distance R.

By using this, the link adjustment range calculating means 32 can calculate Δt to satisfy such conditions that the link B12 of the neighboring moving body neither intersects with the four side faces of the link volume VA12 nor is contained in the link volume VA12 to perform an approximate calculation for the "link adjustment range ΔtA12B12 for the link A12 of the attention moving body." When a link adjustment range is calculated by using the link volume VA12, since the quadratic inequality has just to be solved at most, the calculation time can be shortened compared with the case of solving a higher degree of inequality.

Next, after calculating the link adjustment range, the link adjustment range calculating means 32 modifies the link adjustment range based on the traveling condition data on "limiting conditions for the attention moving body to travel the link" stored in the traveling condition storage section 42. For example, when there is a traveling condition that the "traveling speed of the attention moving body over the link A12" must not exceed "safe traveling speed V," the link adjustment range calculating means 32 calculates a link adjustment range Δtcnd to satisfy Equation (7).

[Math. 5]

$$\Delta t_{cndL} < \Delta t_{cnd} < \Delta t_{cndU} \quad \text{formula (7)}$$

$$\Delta t_{cnd} \text{ subject to } \left\{ \frac{L_{A12}}{t_{A2}(\Delta t) - t_{A1}(\Delta t)} < V \right\}$$

$$t_{Ak}(\Delta t) = t_{Ak} + \sum_{t=1}^{k} \alpha i \times \Delta t$$

ΔtcndL in Equation (7) indicates a lower limit in the adjustment range Δtcnd. On the other hand, ΔtcndU indicates an upper limit in the adjustment range Δtcnd. Then, the link adjustment range calculating means 32 determines a product set of the "calculated adjustment range ΔtA12B12" and the "link adjustment range Δtcnd" as a new "link adjustment range ΔtA12B12."

Next, a method of deciding on an adjusted traveling plan of the attention moving body will be described. Specifically, the adjusted traveling plan deciding means 33 shown in FIG. 1 performs processing for deciding on the adjusted traveling plan.

In the case of the traveling plans of FIGS. 3 and 4, the link adjustment range calculating means 32 outputs the calculated link adjustment ranges tA01B01, tA01B01, tA12B01, tA12B02, tA23B01, and tA23B02 to the adjusted traveling plan deciding means 33.

Figure 8:
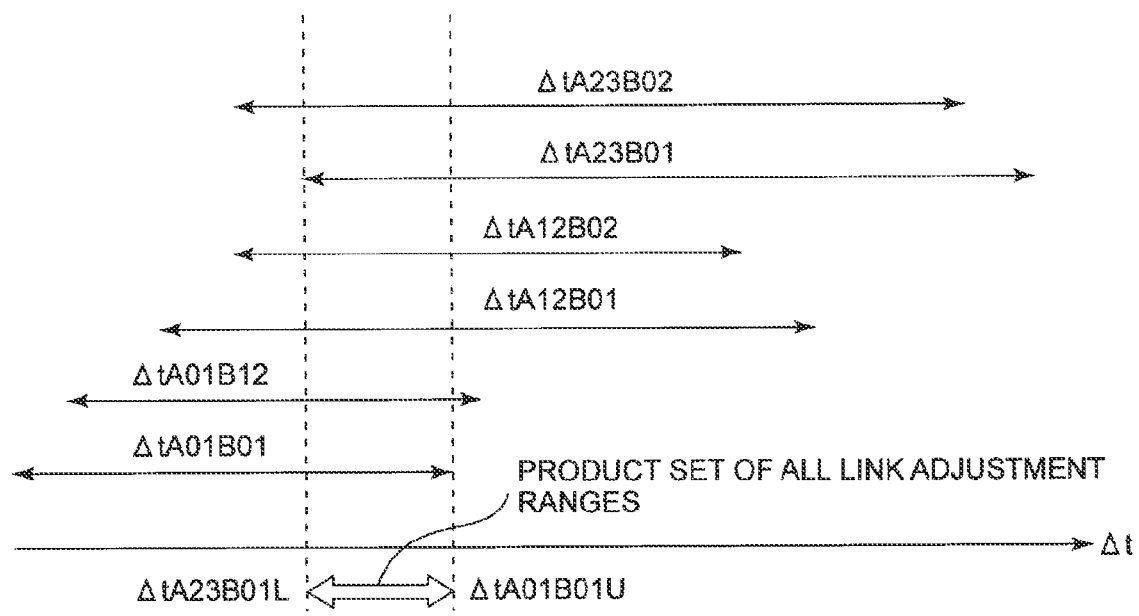
FIG. 8 is an explanatory diagram showing an example of a method of deciding on an adjusted traveling plan.

Next, the adjusted traveling plan deciding means 33 calculates a product set of the link adjustment ranges to decide on the final Δt range. In the case of the traveling plans of FIGS. 3 and 4, the adjusted traveling plan deciding means 33 decides the final Δt range to be "ΔtA23B01L<Δt<ΔtA01B01U" as shown in FIG. 8. FIG. 8 is an explanatory diagram showing an example of the decision method for an adjusted traveling plan.

In other words, since a near-miss between the attention moving body and the neighboring moving body can be avoided if Δt satisfies "ΔtA23B01L<Δt<ΔtA01B01U," the adjusted traveling plan deciding means 33 calculates scheduled pass-through times (tA1, tA2) from Δt as in the example shown in FIG. 6 to decide on an adjusted traveling plan. Specifically, based on the scheduled pass-through times (tA1, tA2) calculated, the adjusted traveling plan deciding means 33 generates traveling plan data indicative of the adjusted traveling plan and outputs the traveling plan data to the adjusted traveling plan output device 5. When the product set of link adjustment ranges is empty, the adjusted traveling plan deciding means 33 determines that there is no adjusted traveling plan capable of avoiding a near-miss.

After that, the adjusted traveling plan output device 5 performs control, for example, to display, on a display section, the traveling plan data output from the adjusted traveling plan deciding means 33.

In the aforementioned first exemplary embodiment, the description is made on the example in which the link adjustment range calculating means 32 modifies the link adjustment range (ΔtA12B12) based on the traveling condition data stored in the traveling condition storage section 42, but the order of processing is not limited thereto. For example, processing may be performed in such a manner that the link adjustment range calculating means 32 outputs the link adjustment range (Δtcnd) calculated from the traveling condition data to the adjusted traveling plan deciding means 33, and the adjusted traveling plan deciding means 33 calculates a product set of the link adjustment range (ΔtA12B12) and the link adjustment range (Δtcnd) to decide on the adjusted traveling plan.

Further, in the exemplary embodiment, the processing for creating links is performed after the attention traveling plan input device 1 and the neighboring traveling plan input device 2 output traveling plan data to the data processing device 3, but processing may be performed in such a manner that the attention traveling plan input device 1 and the neighboring traveling plan input device 2 create links in advance, and output the link creation results to the data processing device 3.

Next, the effect of the exemplary embodiment will be described.

In the exemplary embodiment, since an adjusted traveling plan is decided based on the "adjustment 'range' (link adjustment range) of a scheduled pass-through time of the attention moving body" calculated for each link, there is no need to repeatedly perform "attention traveling plan sequential adjustment processing" and "near-miss simulation processing." Therefore, the adjusted traveling plan that causes no near-miss between the attention moving body and the neighboring moving body can be decided at high speed.

Exemplary Embodiment 2

Figure 9:
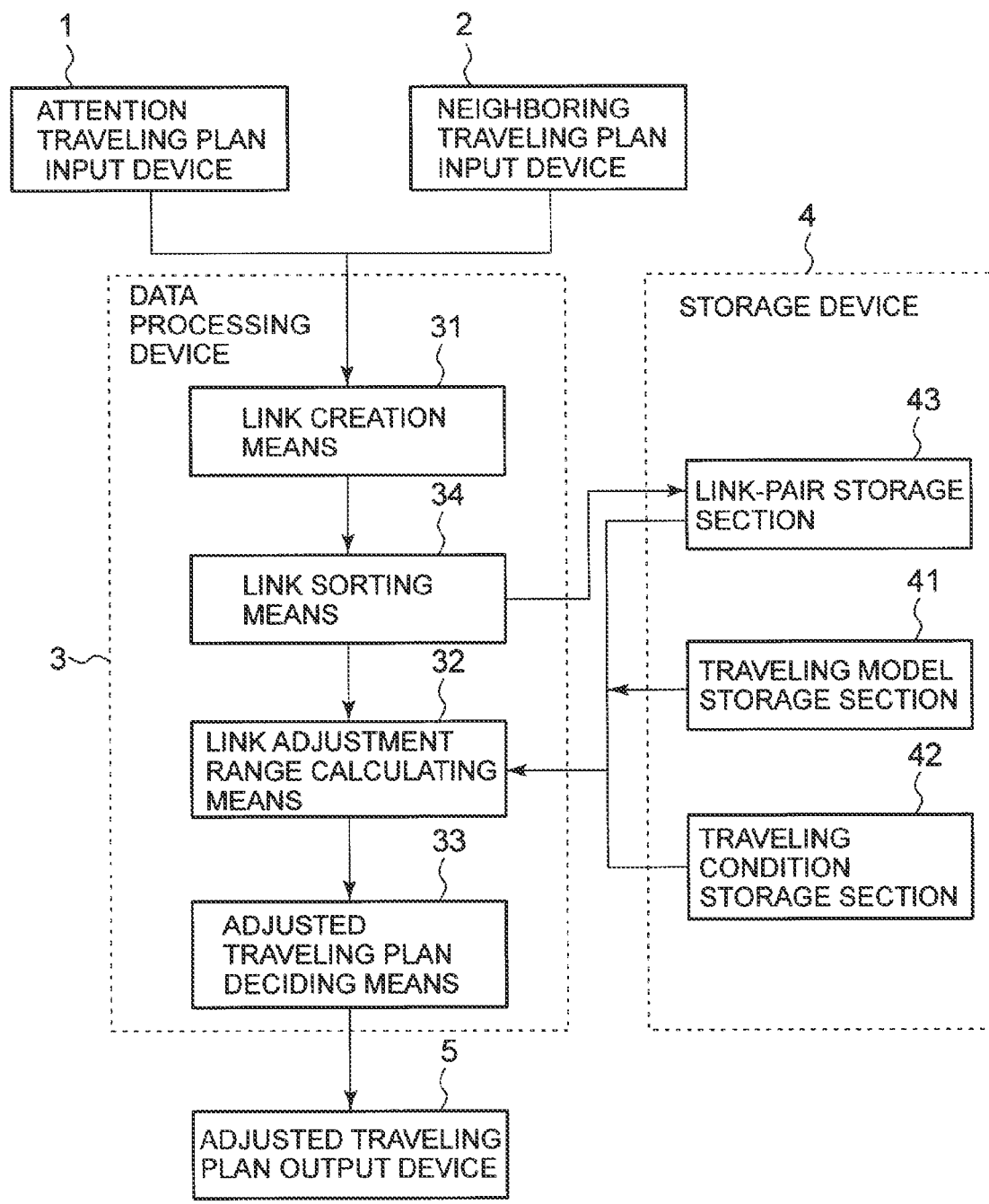
FIG. 9 is a block diagram showing an example of the configuration of a second exemplary embodiment of a scheduling system.

Next, a second exemplary embodiment of the present invention will be described with reference to the accompanying drawings. FIG. 9 is a block diagram showing an example of the configuration of the second exemplary embodiment of a scheduling system.

Referring to FIG. 9, the scheduling system in the exemplary embodiment is configured such that the data processing device 3 includes link sorting means 34 and the storage device 4 includes a link-pair storage section 43 in addition to the configuration of the first exemplary embodiment shown in FIG. 1.

The link sorting means 34 is specifically implemented by a CPU of an information processing apparatus operating according to a program. The link sorting means 34 has the function of calculating the shortest distance between "each link of an attention moving body" and "each link of a neighboring moving body" created by the link creation means 31 to specify a link pair (hereinafter called a link pair for which a link adjustment range is to be calculated) between which the shortest distance falls below safe distance R. The link sorting means 34 also has the function of storing, in the link-pair storage section 43, the specified link pair for which a link adjustment range is to be calculated.

In the exemplary embodiment, the link adjustment range calculating means 32 calculates a link adjustment range only for the link pair for which a link adjustment range is to be calculated and stored in the link-pair storage section 43.

Figure 10:
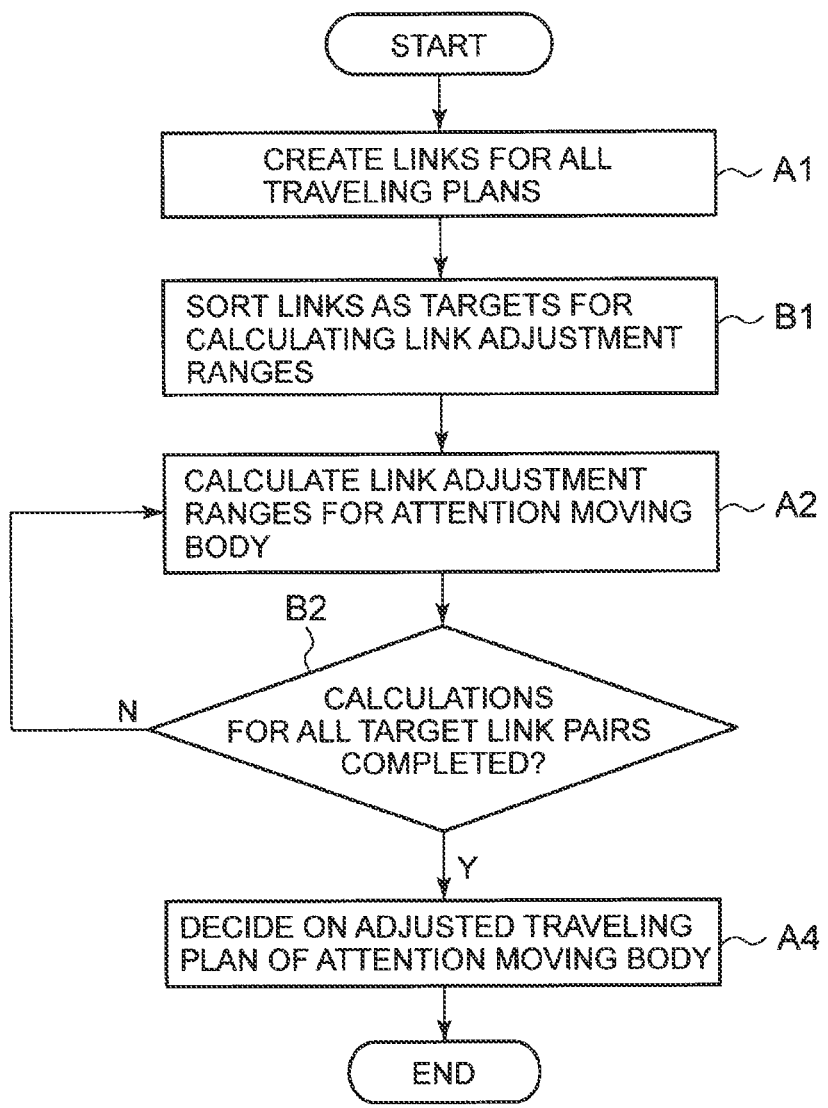
FIG. 10 is a flowchart showing an example of operation performed by the scheduling system.

Referring next to FIG. 9 and FIG. 10, the operation of the scheduling system in the exemplary embodiment will be described. FIG. 10 is a flowchart showing an example of operation performed by the scheduling system.

Since operations in steps A1, A2, and A4 shown in FIG. 10 are the same as those performed by the link creation means 31, the link adjustment range calculating means 32, and the adjusted traveling plan deciding means 33 in the first exemplary embodiment, redundant description thereof will be omitted.

In the first exemplary embodiment, link adjustment ranges are calculated (link adjustment range calculating means 32) for all link pairs of "links in the attention traveling plan" and "links in the neighboring traveling plan" created by the link creation means 31 to decide on an adjusted traveling plan of the attention moving body.

On the other hand, in this exemplary embodiment, the link sorting means 34 calculates the shortest distance between "each link of the attention moving body" and "each link of the neighboring moving body" created in step A1 by the link creation means 31 to specify a pair of links (a link pair for which a link adjustment range is to be calculated) between which the shortest distance falls below the safe distance R. Then, the link sorting means 34 stores, in the link-pair storage section 43, the specified link pair for which a link adjustment range is to be calculated (step B1).

After that, the link adjustment range calculating means 32 calculates a link adjustment range only for the link pair for which a link adjustment range is to be calculated and stored in the link-pair storage section 43 (step A2 and step B2).

Next, the adjusted traveling plan deciding means 33 calculates a product set of link adjustment ranges capable of avoiding any near-miss commonly for all links based on the link adjustment ranges calculated by the link adjustment range calculating means 32 according to the same processing as in the first exemplary embodiment to decide on an adjusted traveling plan (step A4). Specifically, the adjusted traveling plan deciding means 33 generates traveling plan data indicative of an adjusted traveling plan based on the calculated product set of link adjustment ranges and outputs the traveling plan data to the adjusted traveling plan output device 5.

Next, a specific example of the operation of the scheduling system of the second exemplary embodiment will be described.

This exemplary embodiment differs from the first exemplary embodiment in that, in addition to the configuration of the first exemplary embodiment, the data processing device 3 includes the link sorting means 34 and the storage device 4 includes the link-pair storage section 43.

Figure 11:
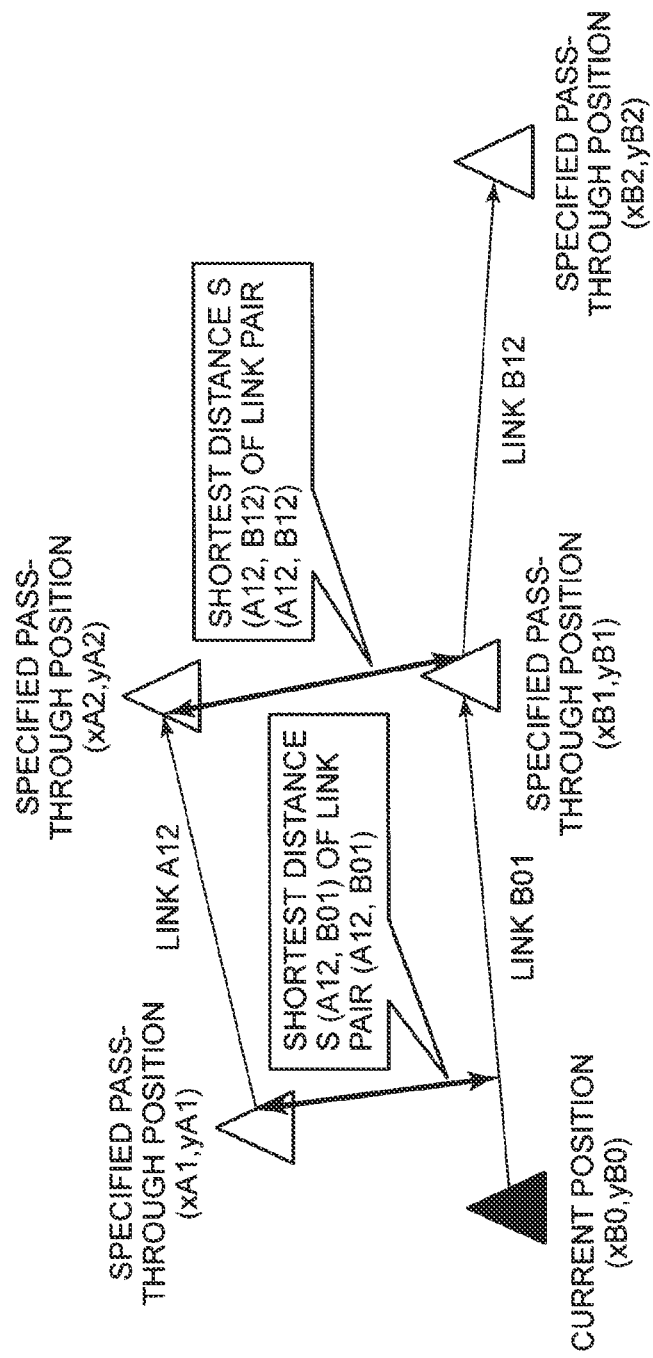
FIG. 11 is an explanatory diagram showing an example of a method of deciding on a link pair for which an adjustment range is to be calculated.

A method by which the link sorting means 34 specifies a link pair for which an adjustment range is to be calculated will be described with reference to FIG. 11. FIG. 11 is an explanatory diagram showing an example of a method of deciding on the link pair for which an adjustment range is to be calculated. Shown in FIG. 11 are link A12 of an attention moving body consisting of specified pass-through positions (xA1, yA1) and (xA2, yA2) and links B01 and B12 of a neighboring moving body consisting of specified pass-through positions (xB0, yB0), (xB1, yB1), and (xB2, yB2).

First, the link sorting means 34 calculates the shortest distance S (A12, B01) between links in link pair (A12, B01) consisting of links A12 and B01.

Next, the link sorting means 34 determines whether the calculated shortest distance S (A12, B01) falls below the safe distance R.

Then, when determining that S (A12, B01) falls below the safe distance R (S(A12, B01)<R), the link sorting means 34 determines that there is a possibility of a near-miss between the "attention moving body traveling link A12" and the "neighboring moving body traveling link B01" and stores, in the link-pair storage section 43, the link pair (A12, B01) as a link pair for which an adjustment range is to be calculated.

In other words, the link sorting means 34 determines the possibility of a near-miss based only on the shortest distance between the "attention moving body located on link A12 at any time" and the "neighboring moving body located on link B01 at any time."

Similarly, the link sorting means 34 calculates the shortest distance S (A12, B12) of link pair (A12, B12) for the remaining link B12 of the neighboring moving body. Then, the link sorting means 34 determines whether the calculated shortest distance S (A12, B12) falls below the safe distance R to determine whether A12 and B12 are a link pair for which an adjustment range is to be calculated.

After that, upon completion of determination on link pairs, for which adjustment ranges are to be calculated, for all pairs of "all links of the attention moving body" and "all links of the neighboring moving body," the link sorting means 34 ends the processing.

As a different from the first exemplary embodiment, it is important in this exemplary embodiment that there is no need to use any scheduled pass-through time t in order to specify a link pair for which an adjustment range is to be calculated. In other words, the link sorting means 34 has just to specify the link pair, for which an adjustment range is to be calculated, using only the position data (x, y) on the moving bodies.

This is because the scheduled pass-through time t at a specified pass-through position (x, y) of the attention moving body is changed by the link adjustment range calculating means 32 and the adjusted traveling plan deciding means 33, which perform processing after the link sorting means 34. In other words, the link sorting means 34 cannot determine the possibility of a near-miss even if a link pair for which an adjustment range is to be calculated is specified in consideration of the scheduled pass-through time t.

Figure 12:
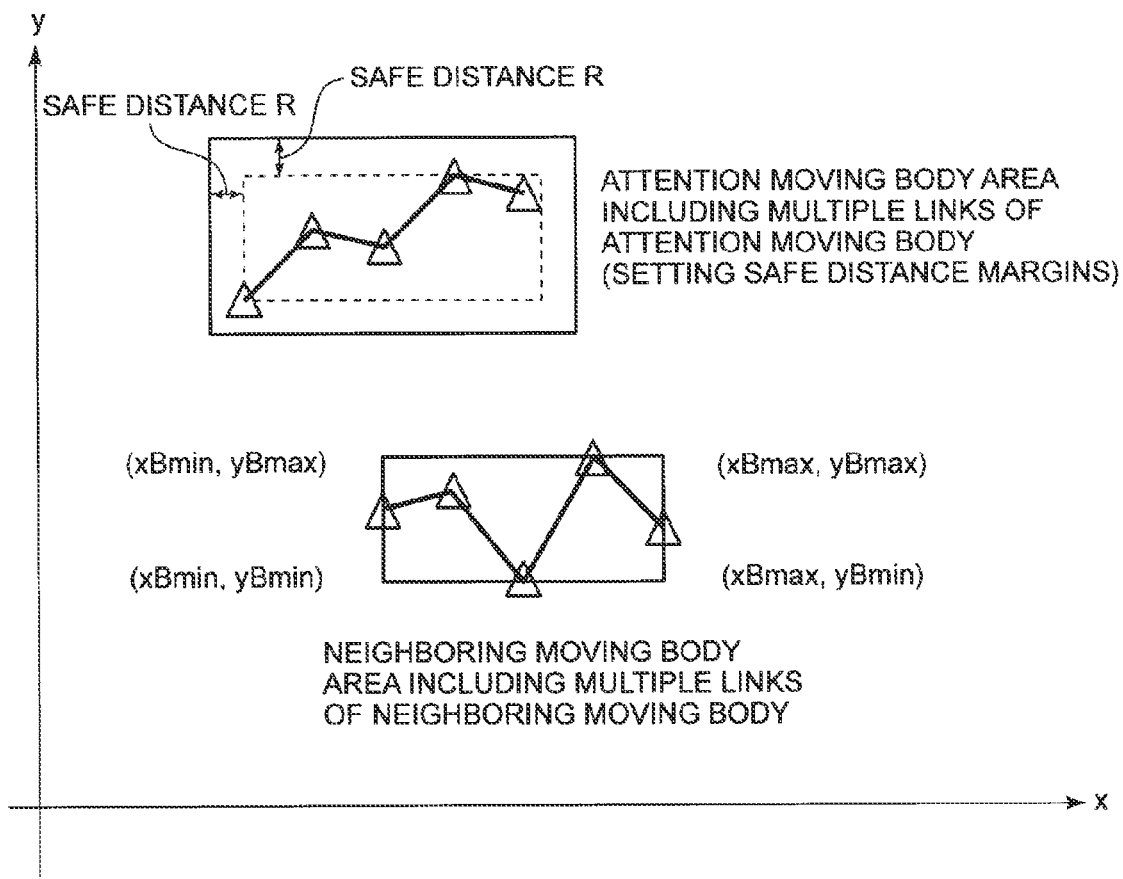
FIG. 12 is an explanatory diagram showing an example of a moving body area used to decide on a link pair for which an adjustment range is to be calculated.

As the number of links of a moving body increases, the number of all combinations of "all links of the attention moving body" and "all links of the neighboring moving body" increases. In this case, it may take long time to perform processing for specifying a link pair as a target for an adjustment range. Therefore, as shown in FIG. 12, an area (hereinafter called a moving body area) including a traveling route line graph consisting of multiple links may be used to shorten the time for specifying a link pair as the target for an adjustment range.

Figure 13:
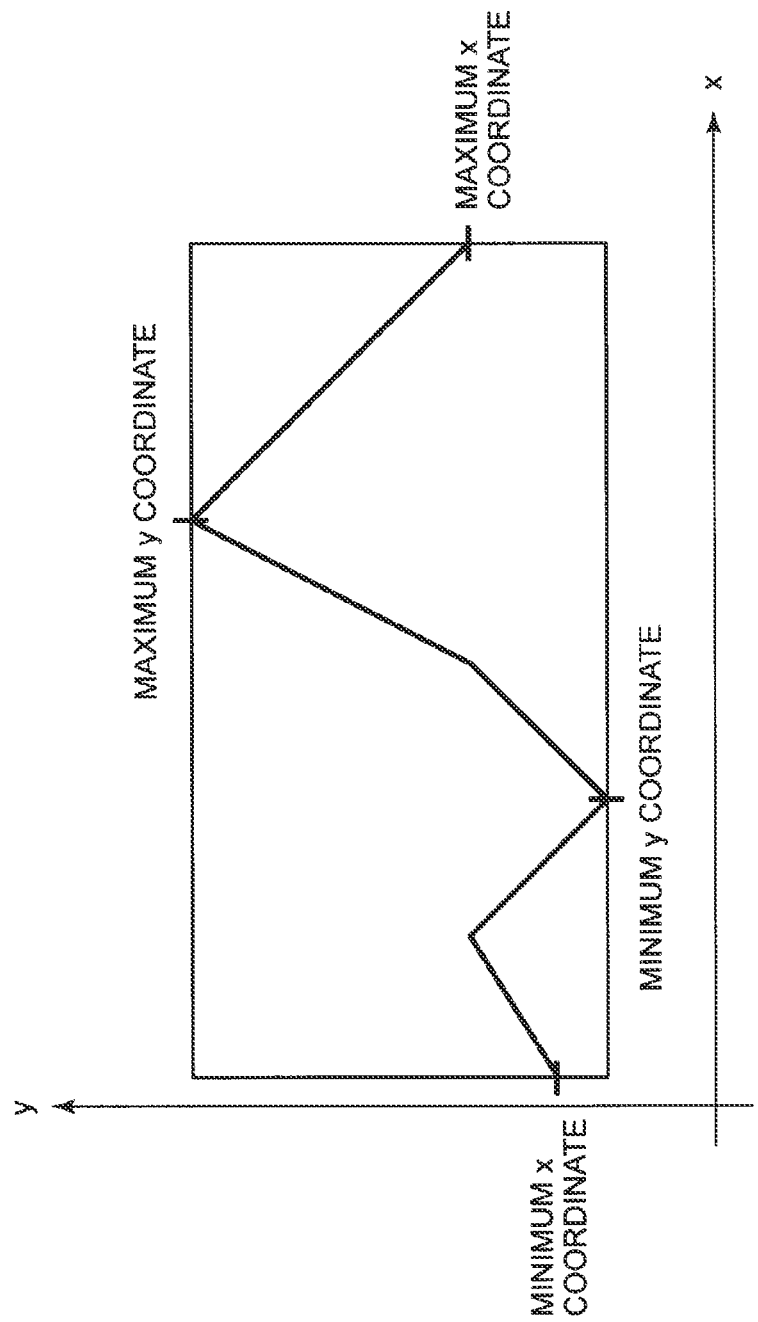
FIG. 13 is an explanatory diagram showing an example of a rectangular moving body area.

As a specific example of a traveling area of the neighboring moving body (hereinafter called a neighboring moving body area), there is a rectangular area shown in FIG. 13. FIG. 13 is an explanatory diagram showing an example of the rectangular moving body area.

The link sorting means 34 uses "maximum x coordinate xBmax, minimum x coordinate xBmin" and "maximum y coordinate yBmax, minimum y coordinate yBmin" extracted as a neighboring moving body area from the specified pass-through positions (x, y) of all the links of the neighboring moving body to create a rectangular area.

Like the neighboring moving body area, the link sorting means 34 also creates a traveling area of the attention moving body (hereinafter called an attention moving body area) in the shape of a rectangular area, but the area is enlarged by a length of the safe distance R.

Next, the link sorting means 34 determines a superposition between the attention moving body area and the neighboring moving body area to determine the possibility of a near-miss between the "attention moving body traveling links included in the attention moving body area" and the "neighboring moving body traveling links included in the neighboring moving body area." Specifically, when the attention moving body area and the neighboring moving body area are overlapped, the link sorting means 34 determines the possibility of a near-miss. Thus, since link pairs for which adjustment ranges are to be calculated can be specified collectively for multiple links by using the moving body areas, the time for specifying link pairs as targets for adjustment ranges can be shortened.

The shape of a moving body area may be any shape other than the rectangular area shown in FIG. 13. As a moving body area other than the rectangular area shape, for example, there is a parallelogram-shaped area shown in FIG. 14.

The parallelogram-shaped area is a closed surface including line segment T and line segment B, obtained by translating, along y axis, an approximate straight line calculated using the specified pass-through positions (x, y) of all the links included in the moving body area, and line segment L and line segment R, obtained by the minimum x coordinate and the maximum x coordinate extracted from the specified pass-through positions (x, y) of all the links included in the moving body area.

Figure 14:
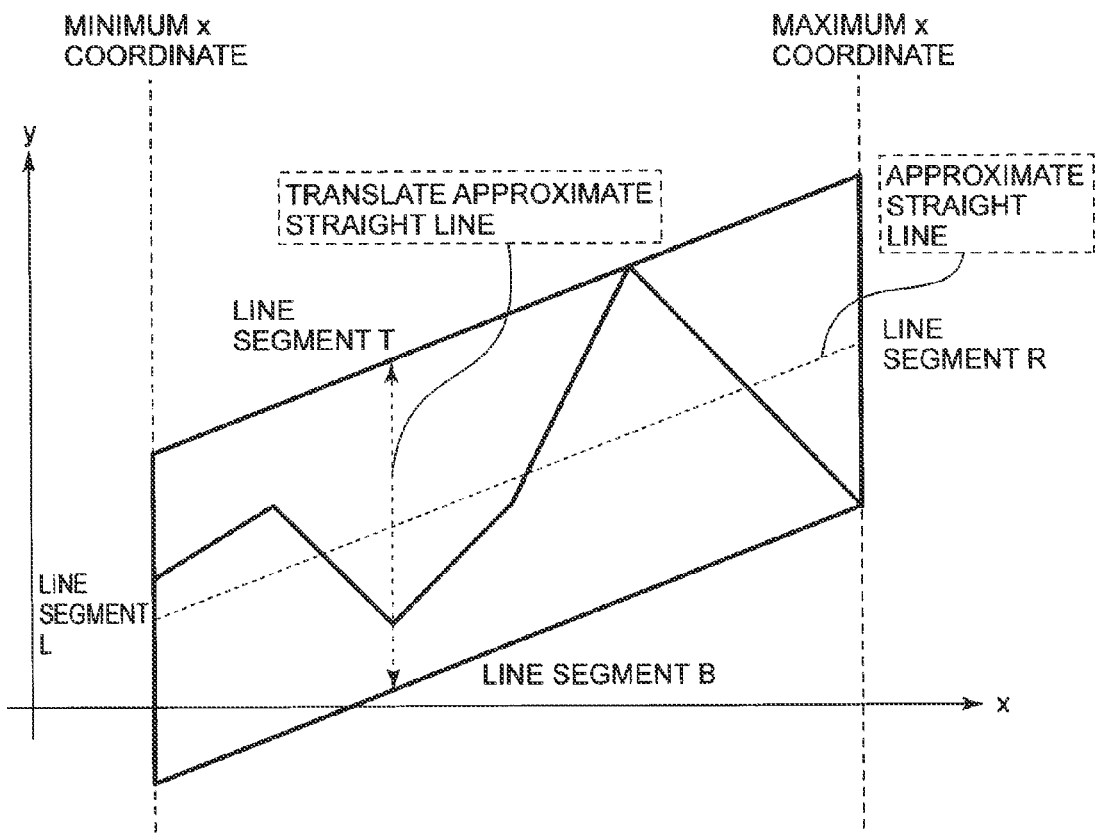
FIG. 14 is an explanatory diagram showing an example of a parallelogram-shaped moving body area.

As shown in FIG. 14, the parallelogram-shaped area is of a shape more fitted for the route line graph consisting of multiple links of the moving body than that of the rectangular area. Therefore, the link sorting means 34 can use this to specify link pairs as the targets for adjustment ranges more closely.

Next, the link adjustment range calculating means 32 calculates link adjustment ranges only for the link pairs as the targets for adjustment ranges stored in the link-pair storage section 43 and outputs the calculated link adjustment ranges to the adjusted traveling plan deciding means 33.

As described above, in the second exemplary embodiment, the attention traveling plan input device 1 and the neighboring traveling plan input device 2 perform processing for creating and sorting links after outputting traveling plan data to the data processing device 3, but the order of processing is not limited thereto. For example, the attention traveling plan input device 1 and the neighboring traveling plan input device 2 can perform processing for creating and sorting links in advance to output the link sorting results to the data processing device 3.

Next, the effect of the exemplary embodiment will be described.

In the exemplary embodiment, link pairs (link pairs for which link adjustment ranges are to be calculated) as targets for calculating link adjustment ranges based on the shortest distance between "each link of the attention moving body" and "each link of the neighboring moving body" are narrowed down in advance. This can reduce the number of link adjustment range calculations performed by the link adjustment range calculating means 32 in FIG. 9. Therefore, an adjusted traveling plan that does not cause a near-miss between the attention moving body and the neighboring moving body can be decided at high speed.

From the above, it can be said that the scheduling system according to the present invention includes the following means for solving the problem.

The scheduling system according to the present invention includes: link creation means (the link creation means 31 in FIG. 1) for creating a "line segment (called a link) connecting between different two specified pass-through positions of a moving body," link adjustment range calculating means (the link adjustment range calculating means 32 in FIG. 1) for calculating, for each link, an "adjustment 'range' (link adjustment range) of a scheduled pass-through time of an attention moving body" based on a "traveling model (stored in the traveling model storage section 41 in FIG. 1) when the moving body travels the link" and "limiting conditions (stored in the traveling condition storage section 42 in FIG. 1) when the moving body travels the link" so that the attention moving body will not have a near-miss with a neighboring moving body; and adjusted traveling plan deciding means (the adjusted traveling plan deciding means 33 in FIG. 1) for deciding on an adjusted traveling plan using link adjustment ranges calculated by the link adjustment range calculating means.

Since such a configuration is adopted to decide on an adjusted traveling plan based on the link adjustment range of the attention moving body calculated for each link, there is no need to repeatedly perform "attention traveling plan sequential adjustment processing" and "near-miss simulation processing," and this can lead to solving the problem.

It can be said that the present invention has the following effect.

The effect of the present invention is to be able to decide on an adjusted traveling plan at high speed not to cause a near-miss between the attention moving body and the neighboring moving body merely by storing the "traveling model when a moving body travels a link."

This is because the adjusted traveling plan is decided based on the link adjustment range of the attention moving body calculated for each link to eliminate the need to repeatedly perform "attention traveling plan sequential adjustment processing" and "near-miss simulation processing."

Figure 15:
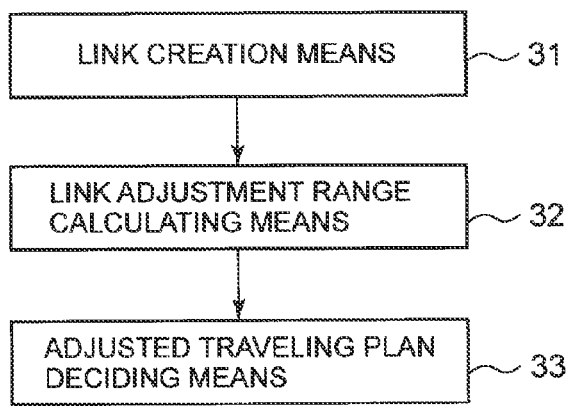
FIG. 15 is a block diagram showing an example of the minimum configuration of a scheduling system.

Next, the minimum configuration of a scheduling system according to the present invention will be described. FIG. 15 is a block diagram showing the minimum configuration of the scheduling system. As shown in FIG. 15, the scheduling system includes, as minimum components, link creation means 31, link adjustment range calculating means 32, and adjusted traveling plan deciding means 33.

In the minimum configuration of the scheduling system shown in FIG. 15, the link creation means 31 creates a link as a partial route obtained by dividing the traveling route of a moving body indicated by traveling plan data. Next, the link adjustment range calculating means 32 calculates, for each link, a link adjustment range as the adjustment range of a scheduled pass-through time of the moving body not to cause the moving body to have a near-miss with another moving body. Next, the adjusted traveling plan deciding means 33 decides on adjusted traveling plan data indicative of a traveling plan of the moving body after adjusted by using link adjustment ranges of all links constructing a traveling route.

Thus, according to the minimum configuration of the scheduling system, an adjusted traveling plan for enabling a predetermined moving body to avoid a near-miss with another moving body can be decided in a short time.

Note that, in the exemplary embodiments, characteristic configurations of scheduling systems as shown in the following (1) to (8) are illustrated:

(1) A scheduling system is characterized by including: link creation means (e.g., realized by the link creation means 31) for creating a link (e.g., link A01) as a partial route obtained by dividing the traveling route of a moving body indicated by traveling plan data; link adjustment range calculating means (e.g., realized by the link adjustment range calculating means 32) for calculating, for each link, a link adjustment range (e.g., ΔtA01B01) as the adjustment range of a scheduled pass-through time of the moving body not to cause the moving body to have a near-miss with another moving body; and adjusted traveling plan deciding means (e.g., realized by the adjusted traveling plan deciding means 33) for deciding on adjusted traveling plan data indicative of a traveling plan of the moving body after adjusted by using link adjustment ranges of all links constructing the traveling route.

(2) The scheduling system may be configured such that the scheduling system is to decide on an adjusted traveling plan for a moving body traveling according to a traveling plan for passing through a predetermined, specified pass-through position at a predetermined, scheduled pass-through time not to cause the moving body to have a near-miss with another moving body, and the adjusted traveling plan deciding means decides on the adjusted traveling plan data based on traveling model data indicative of traveling characteristics when the moving body travels along the traveling route and traveling condition data indicative of limiting conditions when the moving body travels along the traveling route.

(3) The scheduling system may be configured to further include: traveling model storage means (e.g., realized by the traveling model storage section 41) for storing the traveling model data; and traveling condition storage means (e.g., realized by the traveling condition storage means 42) for storing the traveling condition data, wherein the link adjustment range calculating means calculates a link adjustment range based on the traveling model data stored in the traveling model storage means and the traveling condition data stored in the traveling condition storage means.

(4) The scheduling system may be configured such that the link adjustment range calculating means calculates, for each link, a link adjustment range based on the traveling model data on each link stored in the traveling model storage means so that a predetermined moving body will not have a near-miss with another moving body.

(5) The scheduling system may be configured such that the link adjustment range calculating means modifies the calculated link adjustment range based on the traveling condition data on each link stored in the traveling condition storage means to decide on a new link adjustment range.

(6) The scheduling system may be configured such that the adjusted traveling plan deciding means calculates a product set of link adjustment ranges capable of avoiding any near-miss between moving bodies commonly for all links based on the link adjustment ranges calculated by the link adjustment range calculating means to decide on adjusted traveling plan data on a moving body based on the calculated product set of link adjustment ranges.

(7) The scheduling system may be configured to further include link sorting means (e.g., realized by the link sorting means 34) for calculating the shortest distance (e.g., the shortest distance S) between a link of a predetermined moving body and a link of another moving body to specify a pair of links between which the calculated shortest distance is a predetermined distance (e.g., safe distance R) or less, wherein the link adjustment range calculating means calculates a link adjustment range for the link pair specified by the link sorting means.

(8) The scheduling system may be configured such that the link sorting means uses a moving body area (e.g., the attention moving body area shown in FIG. 12) including a traveling route consisting of multiple links of a moving body to determine a superposition between moving body areas (e.g., to determine a superposition between the attention moving body area and the neighboring moving body area) in order to determine whether the moving bodies have a near-miss with each other, and specifies, based on the determination result, a pair of links between which the shortest distance is a predetermined distance or less.

Part or all of the aforementioned exemplary embodiments can be described as, but not limited to, the following supplementary notes:

(Supplementary Note 1) A scheduling system characterized by including: link creation means for creating a link as a partial route obtained by dividing a traveling route of a moving body indicated by traveling plan data; link adjustment range calculating means for calculating, for each link, a link adjustment range as the adjustment range of a scheduled pass-through time of the moving body not to cause the moving body to have a near-miss with another moving body; and adjusted traveling plan deciding means for deciding on adjusted traveling plan data indicative of a traveling plan of the moving body after adjusted by using link adjustment ranges of all links constructing the traveling route.

(Supplementary Note 2) The scheduling system according to Supplementary Note 1, wherein the scheduling system is to decide on an adjusted traveling plan for a moving body traveling according to a traveling plan for passing through a predetermined, specified pass-through position at a predetermined, scheduled pass-through time not to cause the moving body to have a near-miss with another moving body, and the adjusted traveling plan deciding means decides on the adjusted traveling plan data based on traveling model data indicative of traveling characteristics when the moving body travels along the traveling route and traveling condition data indicative of limiting conditions when the moving body travels along the traveling route.

(Supplementary Note 3) The scheduling system according to Supplementary Note 2, further including: traveling model storage means for storing the traveling model data; and traveling condition storage means for storing the traveling condition data, wherein the link adjustment range calculating means calculates a link adjustment range based on the traveling model data stored in the traveling model storage means and the traveling condition data stored in the traveling condition storage means.

(Supplementary Note 4) The scheduling system according to Supplementary Note 2 or Supplementary Note 3, wherein the link creation means creates a link as a line segment connecting between different two specified pass-through positions of a moving body for traveling plans of all moving bodies.

(Supplementary Note 5) The scheduling system according to Supplementary Note 3 or Supplementary Note 4, wherein the link adjustment range calculating means calculates, for each link, a link adjustment range based on the traveling model data on each link stored in the traveling model storage means so that a predetermined moving body will not have a near-miss with another moving body.

(Supplementary Note 6) The scheduling system according to any one of Supplementary Note 3 to Supplementary Note 5, wherein the link adjustment range calculating means modifies the calculated link adjustment range based on the traveling condition data on each link stored in the traveling condition storage means to decide on a new link adjustment range.

(Supplementary Note 7) The scheduling system according to any one of Supplementary Note 2 to Supplementary Note 6, wherein the adjusted traveling plan deciding means calculates a product set of link adjustment ranges capable of avoiding any near-miss between moving bodies commonly for all links based on the link adjustment ranges calculated by the link adjustment range calculating means to decide on adjusted traveling plan data on a moving body based on the calculated product set of link adjustment ranges.

(Supplementary Note 8) The scheduling system according to any one of Supplementary Note 2 to Supplementary Note 7, further including link sorting means for calculating the shortest distance between a link of a predetermined moving body and a link of another moving body to specify a pair of links between which the calculated shortest distance is a predetermined distance or less, wherein the link adjustment range calculating means calculates a link adjustment range for the link pair specified by the link sorting means.

(Supplementary Note 9) The scheduling system according to Supplementary Note 8, further including link-pair storage means for storing the link pair specified by the link sorting means.

(Supplementary Note 10) The scheduling system according to Supplementary Note 8 or Supplementary Note 9, wherein the link sorting means uses moving body areas, each of which includes a traveling route consisting of multiple links of a moving body, to determine a superposition between the moving body areas in order to determine whether the moving bodies have a near-miss with each other, and specifies, based on the determination result, a pair of links between which the shortest distance is a predetermined distance or less.

(Supplementary Note 11) A scheduling method characterized by including: creating a link as a partial route obtained by dividing a traveling route of a moving body indicated by traveling plan data; calculating, for each link, a link adjustment range as the adjustment range of a scheduled pass-through time of the moving body not to cause the moving body to have a near-miss with another moving body; and deciding on adjusted traveling plan data indicative of a traveling plan of the moving body after adjusted by using link adjustment ranges of all links constructing the traveling route.

(Supplementary Note 12) The scheduling method according to Supplementary Note 11, wherein the scheduling method is to decide on an adjusted traveling plan for a moving body traveling according to a traveling plan for passing through a predetermined, specified pass-through position at a predetermined, scheduled pass-through time not to cause the moving body to have a near-miss with another moving body, and the adjusted traveling plan data is decided based on traveling model data indicative of traveling characteristics when the moving body travels along the traveling route and traveling condition data indicative of limiting conditions when the moving body travels along the traveling route.

(Supplementary Note 13) A scheduling program causing a computer to perform: link creation processing for creating a link as a partial route obtained by dividing a traveling route of a moving body indicated by traveling plan data; link adjustment range calculation processing for calculating, for each link, a link adjustment range as the adjustment range of a scheduled pass-through time of the moving body not to cause the moving body to have a near-miss with another moving body; and adjusted traveling plan decision processing for deciding on adjusted traveling plan data indicative of a traveling plan of the moving body after adjusted by using link adjustment ranges of all links constructing the traveling route.

(Supplementary Note 14) The scheduling program according to Supplementary Note 13, wherein the scheduling program is to decide on an adjusted traveling plan for a moving body traveling according to a traveling plan for passing through a predetermined, specified pass-through position at a predetermined, scheduled pass-through time not to cause the moving body to have a near-miss with another moving body, and to cause the computer in the adjusted traveling plan decision processing to decide on the adjusted traveling plan data based on traveling model data indicative of traveling characteristics when the moving body travels along the traveling route and traveling condition data indicative of limiting conditions when the moving body travels along the traveling route.

As described above, although the present invention is described with reference to the exemplary embodiments and examples, the present invention is not limited to the aforementioned exemplary embodiments and examples. Various changes that can be understood by those skilled in the art within the scope of the present invention can be made to the configurations and details of the present invention.

This application claims priority based on Japanese Patent Application No. 2010-061120, filed Mar. 17, 2010, the entire disclosure of which is incorporated herein by reference.

INDUSTRIAL APPLICABILITY

The present invention can be applied for the purpose of deciding on a traveling plan of a moving body such as an airplane, a train, or a bus. Further, the function of detecting a near miss between moving bodies at high speed to decide on a traveling plan can also be applied for the purpose of preventing a collision accident between moving machines at a factory or in a work area.

REFERENCE SIGNS LIST

1 Attention Traveling Plan Input Device
2 Neighboring Traveling Plan Input Device
3 Data Processing Device
4 Storage Device
5 Adjusted Traveling Plan Output Device
31 Link Creation Means
32 Link Adjustment Range Calculating Means
33 Adjusted Traveling Plan Deciding Means
34 Link Sorting Means
41 Traveling Model Storage Section
42 Traveling Condition Storage Section
43 Link-Pair Storage Section

The invention claimed is:

1. A scheduling system which decides on an adjusted traveling plan for a moving body traveling according to a traveling plan for passing through a predetermined, specified pass-through position at a predetermined, scheduled pass-through time not to cause the moving body to have a near-miss with another moving body, comprising:

a link creation unit implemented at least by a hardware including a processor and which creates a link as a partial route obtained by dividing a traveling route of a moving body indicated by traveling plan data;

a link adjustment range calculating unit implemented at least by a hardware including a processor and which calculates, for each link, a link adjustment range as an adjustment range of a scheduled pass-through time of the moving body not to cause the moving body to have a near-miss with another moving body;

an adjusted traveling plan deciding unit implemented at least by a hardware including a processor and which decides on adjusted traveling plan data indicative of a traveling plan of the moving body after adjusted by using link adjustment ranges of all links constructing the traveling route;

a traveling model storage medium for storing the traveling model data indicative of traveling characteristics when the moving body travels along the traveling route; and a traveling condition storage medium for storing the traveling condition data indicative of limiting conditions when the moving body travels along the traveling route, wherein the link adjustment range calculating unit calculates the link adjustment range based on the traveling model data stored in the traveling model storage medium and the traveling condition data stored in the traveling condition storage medium, and wherein the adjusted traveling plan deciding unit decides on the adjusted traveling plan data based on the traveling model data and the traveling condition data.

2. The scheduling system according to claim 1, wherein the link adjustment range calculating unit calculates, for each link, a link adjustment range based on the traveling model data on each link stored in the traveling model storage unit so that a predetermined moving body will not have a near-miss with another moving body.

3. The scheduling system according to claim 1, wherein the link adjustment range calculating unit modifies the calculated link adjustment range based on the traveling condition data on each link stored in the traveling condition storage unit to decide on a new link adjustment range.

4. The scheduling system according to claim 1, wherein the adjusted traveling plan deciding unit calculates a product set of link adjustment ranges capable of avoiding any near-miss between moving bodies commonly for all links based on the link adjustment ranges calculated by the link adjustment range calculating unit to decide on adjusted traveling plan data on a moving body based on the calculated product set of link adjustment ranges.

5. The scheduling system according to claim 1, further comprising a link sorting unit for calculating a shortest distance between a link of a predetermined moving body and a link of another moving body to specify a pair of links between which the calculated shortest distance is a predetermined distance or less, wherein the link adjustment range calculating unit calculates a link adjustment range for the link pair specified by the link sorting unit.

6. The scheduling system according to claim 5, wherein the link sorting unit uses moving body areas, each of which includes a traveling route consisting of a plurality of links of a moving body, to determine a superposition between the moving body areas in order to determine whether the moving bodies have a near-miss with each other, and specifies, based on the determination result, a pair of links between which the shortest distance is a predetermined distance or less.

7. A scheduling method for deciding on an adjusted traveling plan for a moving body traveling according to a traveling plan for passing through a predetermined, specified pass-through position at a predetermined, scheduled pass-through time not to cause the moving body to have a near-miss with another moving body, implemented by a processor, comprising:
creating a link as a partial route obtained by dividing a traveling route of a moving body indicated by traveling plan data;
calculating, for each link, a link adjustment range as an adjustment range of a scheduled pass-through time of the moving body not to cause the moving body to have a near-miss with another moving body; and
deciding on adjusted traveling plan data indicative of a traveling plan of the moving body after adjusted by using link adjustment ranges of all links constructing the traveling route:
wherein calculating the link adjustment range based on traveling model data, stored in a traveling model storage medium, indicative of traveling characteristics when the moving body travels along the traveling route and traveling condition data, stored in a traveling condition storage medium, indicative of limiting conditions when the moving body travels along the traveling route, and
wherein deciding on the adjusted traveling plan data based on the traveling model data and the traveling condition data.

8. A non-transitory computer readable information recording medium storing a scheduling program, when executed by a processor, performs a method for deciding on an adjusted traveling plan for a moving body traveling according to a traveling plan for passing through a predetermined, specified pass-through position at a predetermined, scheduled pass-through time not to cause the moving body to have a near-miss with another moving body:
link creation processing for creating a link as a partial route obtained by dividing a traveling route of a moving body indicated by traveling plan data;
link adjustment range calculation processing for calculating, for each link, a link adjustment range as an adjustment range of a scheduled pass-through time of the moving body not to cause the moving body to have a near-miss with another moving body; and
adjusted traveling plan decision processing for deciding on adjusted traveling plan data indicative of a traveling plan of the moving body after adjusted by using link adjustment ranges of all links constructing the traveling route,
wherein calculating the link adjustment range based on traveling model data, stored in a traveling model storage medium, indicative of traveling characteristics when the moving body travels along the traveling route and traveling condition data, stored in a traveling condition storage medium, indicative of limiting conditions when the moving body travels along the traveling route, and
wherein deciding on the adjusted traveling plan data based on the traveling model data and the traveling condition data.

* * * * *